United States Patent [19]
Pearson

[11] Patent Number: 4,709,120
[45] Date of Patent: Nov. 24, 1987

[54] UNDERGROUND UTILITY EQUIPMENT VAULT

[76] Inventor: Dean C. Pearson, 870 Golden Meadow Ct., Waukesha, Wis. 53186

[21] Appl. No.: 871,281

[22] Filed: Jun. 6, 1986

[51] Int. Cl.$^4$ .............................................. H02G 3/03
[52] U.S. Cl. ................................ 174/16 R; 52/169.5;
52/198; 174/37; 361/384
[58] Field of Search ................... 174/16 R, 37; 52/20,
52/198, 169.5, 169.6, 169.7; 361/379, 383, 384;
204/196, 197; 109/1 S

[56] References Cited

U.S. PATENT DOCUMENTS

| | | | |
|---|---|---|---|
| 344,317 | 5/1969 | Uptegraff, Jr. | 174/15 R |
| 2,187,011 | 1/1940 | Braden | 174/16 R |
| 2,567,855 | 9/1951 | Pippin et al. | 204/197 |
| 2,743,227 | 4/1956 | Waite et al. | 204/197 |
| 3,079,573 | 2/1963 | Smith et al. | 336/55 |
| 3,135,321 | 6/1964 | Butt et al. | 165/154 |
| 3,210,456 | 10/1965 | Skubal | 174/16 |
| 3,254,281 | 5/1966 | McClain | 174/16 |
| 3,334,597 | 8/1967 | Ruskin et al. | 109/1 S |
| 3,345,449 | 10/1967 | Hiller | 174/16 R |
| 3,390,225 | 6/1968 | Couch et al. | 174/16 R |
| 3,405,283 | 10/1968 | Leonard | 174/37 |

OTHER PUBLICATIONS

Ayres, R. et al; (BNR Inc. Palo Alto, Calif.); ECM: An Earth Sheltered Equipment Office; Telesis (Canada, vol. 5, No. 8); Apr. 1978; pp. 232-237.

*Primary Examiner*—Morris H. Nimmo
*Attorney, Agent, or Firm*—Willis B. Swartwout, III

[57] ABSTRACT

An improved underground utility equipment vault is comprised of at least two concentrically disposed chambers. The inner chamber is a non-electrically conductive material such as wood and is disposed in spaced concentric relationship within the outer chamber which is metallic, preferably steel. The exterior surface of the outer chamber is provided with a protective dielectric coating and cathodic protection in the form of sacrificial anodes. The inner chamber is provided with heat vents adjacent its uppermost surface area and cold air returns adjacent its lowermost surface area. The heat vents may be provided with exhaust fans. The inner chamber is provided with above ground air communication and an entryway. The interior of the inner chamber and electric gear therein contained is electrically isolated from the outer chamber and the vault exterior.

7 Claims, 5 Drawing Figures

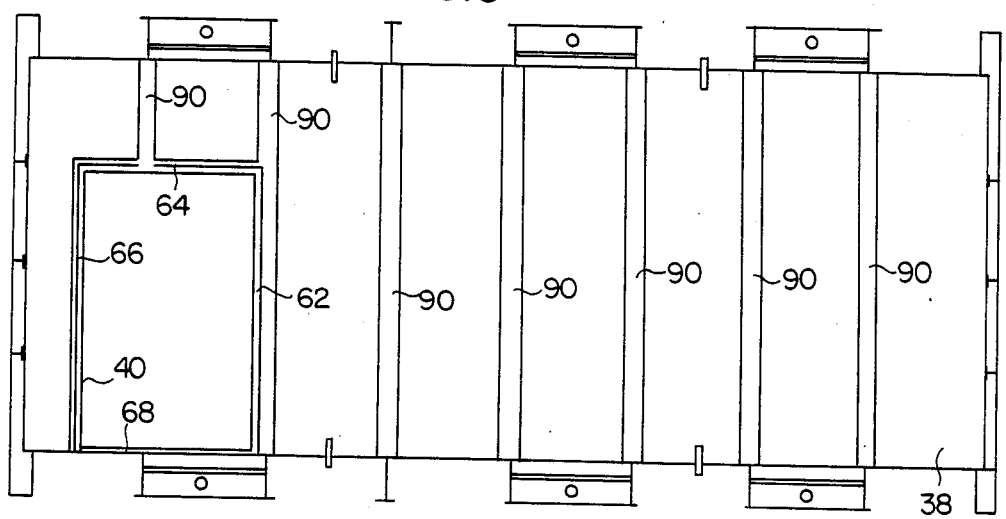
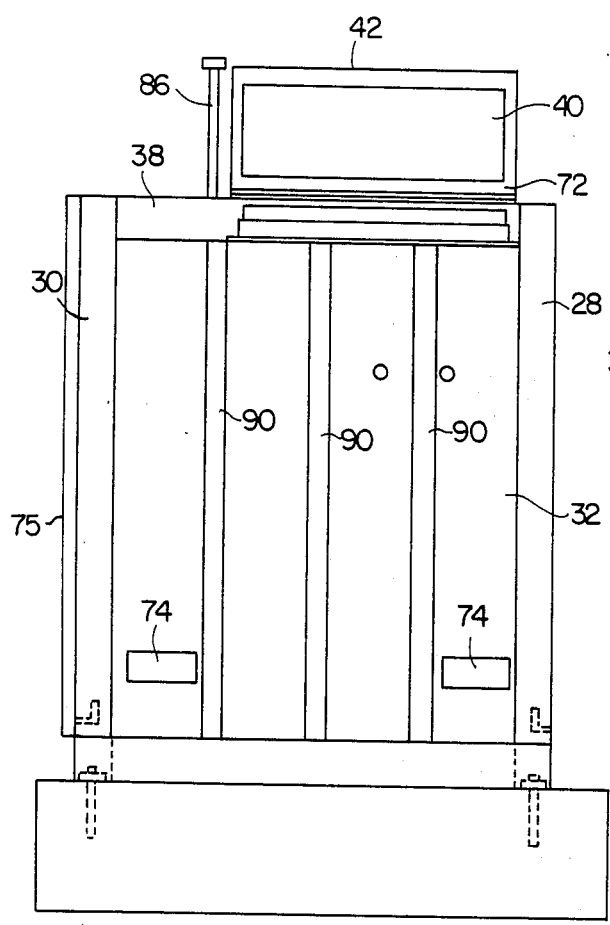
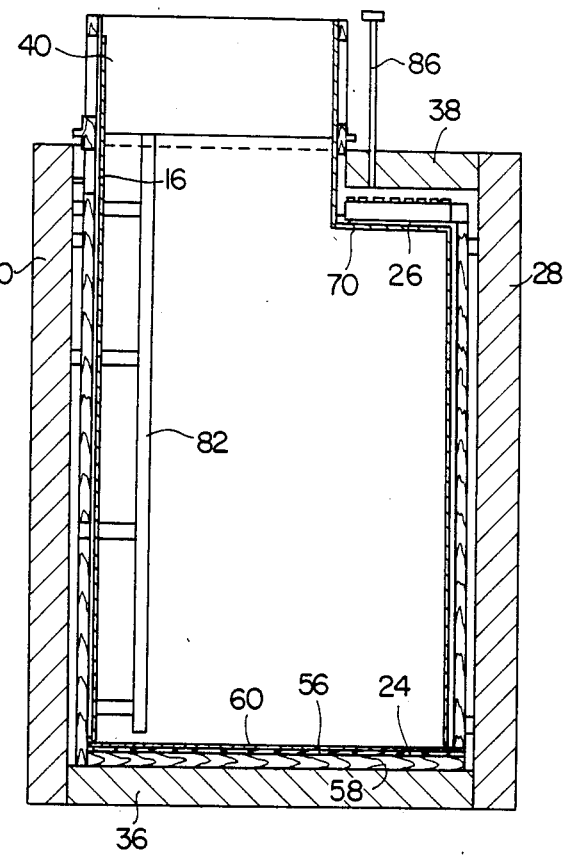

UNDERGROUND UTILITY EQUIPMENT VAULT

BACKGROUND OF THE INVENTION

The field of the invention is underground utility equipment vaults and more particularly to an improved vault provided with a plurality of concentric chambers, the innermost of said chambers passively or convection cooled, and the outermost chamber constructed to be highly resistant to corrosion and simultaneously superior heat dissipating capabilities.

For a variety of ecological, environmental and esthetic reasons, it has become increasingly desirable to locate certain kinds of electronic equipment underground. This has been accomplished by forming a vault enclosure and equipping it above ground and then burying it.

There are several very significant problems with prior art vaults formed and buried in this manner. The first problem is that electronic gear operating within the vault generates a great deal of heat which must be appropriately dissipated to prevent overheat equipment failures and to prevent condensation within the vault which itself could create short-out equipment failures.

Secondly, vaults of the underground type in the past have generally been constructed of concrete and such vaults have been vulnerable to seepage and cracking from freezing and thawing permitting further leakage. Condensation problems and ultimately collapse of the vault itself due to break-up of repeated freezing and thawing. Concrete is a very poor heat exchange material and such vaults must be made with seams increasing their vulnerability.

Additional prior art problems resulted from past inability to isolate interior electrical gear from the metallic vault wall creating a potential for severe electrical shock and resulting in substantial electrolysis effects on the metallic vault.

SUMMARY OF THE INVENTION

The present invention is an improved underground utility equipment vault consisting of at least a pair of chambers concentrically disposed one within the other with all surfaces being relatively equally spaced.

A general object of the invention is to provide a vault of the character described consisting of an inner chamber made from wood or other non-electrically conductive material and an outer chamber made from steel or other metal, the inner chamber containing the electrical or electronic gear, thereby electrically isolating the gear, substantially reducing, if not eliminating the electrolysis effect of the gear on the exterior or outer vault. Such structure also results in protecting repair or service personnel who later may need to enter the vault from electrical shock by grounding and/or insulating the gear or equipment.

A second object of the present invention is to provide in the structure above described one or more heat vents and cold air returns in the inner chamber communicating the interior of the inner chamber with the space between the inner and outer chambers setting up a passive or convection flow of heat from the gear operating in the inner chamber with the space whereby the heat may be dissipated by heat exchange through the walls of the steel or metal outer chamber to the surrounding ground. The heat vents may be further provided with exhaust fans to improve the flow.

A third object of the present invention recognizes the constant existence of moisture in the earth below surface by providing in a vault of the character above described the coating of the exterior surfaces of the metal or steel outer chamber with a protective dielectric coating and cathodic protection through the use of sacrificial anodes which in cooperation with the electrical isolation of the inner chamber contents substantially eliminates corrosion and equipment failures which otherwise would result from water seepage into the inner chamber area.

Another object of the invention as above described is through the passive or convection cooling system, without or with fan assistance, to maintain sufficient temperature control within the chambers by air circulation so as to inhibit to a substantial extent the formation of condensation moisture resulting from substantial temperature differentials that exist between the inside of the inner chamber and the space between the outside of the inner chamber and the inside of the outer chamber and between the ground outside of the outer chamber and the air space between the inside of the outer chamber and the outside of the inner chamber.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 3, is a top plan view of the outer chamber top wall;

FIG. 4 is an end plan view of the structure shown in FIG. 1 taken from the right side of FIG. 1;

FIG. 5 is a vertical cross-section through the structure shown in FIG. 2 taken along line V—V of FIG. 2 looking in the direction of the arrows.

DESCRIPTION OF THE PREFERRED EMBODIMENT

Figure 1:
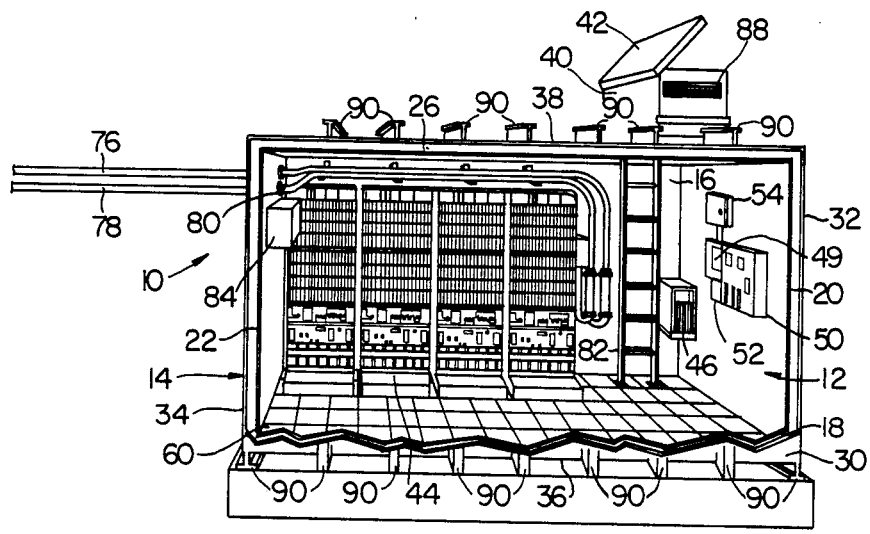
FIG. 1 is a perspective elevational view of a vault embodying the invention with one wall broken partially away to disclose details of the vault interior and of construction.
Figure 2:
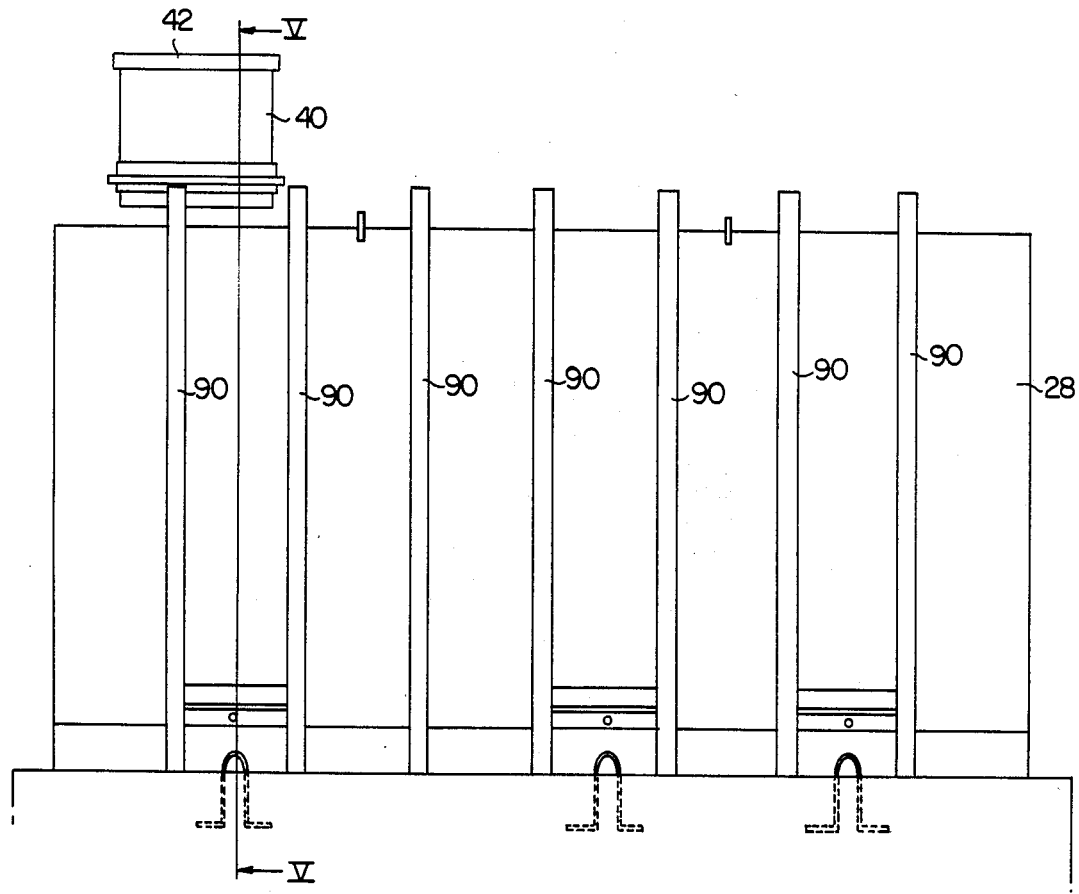
FIG. 2 is a side elevational view of the structure shown in FIG. 1 taken from the rear of FIG. 1.

Referring now to the drawings and particularly to FIG. 1 thereof, a vault is disclosed generally identified by the numeral 10. Vault 10 is comprised of an inner chamber 12 and an outer chamber 14.

Inner chamber 12 is in the preferred embodiment constructed of wood which is a non-electrically conductive material and includes side walls 16 and 18, end walls 20 and 22, bottom wall 24 (shown in FIG. 5) and top wall 26.

Outer chamber 14 is in the preferred embodiment constructed of steel which is electrically conductive but possesses well known heat exchange capabilities. Chamber 14 includes side walls 28 and 30, end walls 32 and 34, bottom wall 36 and top wall 38.

The joinders of the walls 16, 18, 20, 22, 24 and 26 of chamber 12 are sealed in a watertight manner as are the joinders of walls 28, 30, 32, 34, 36 and 38 of chamber 14. The outer chamber wall joints are made with both interior and exterior continuous welds which are tested for leakage by sealing the outer chamber 14 and pressure testing it to 5 PSI.

All of the walls 16, 18, 20, 22, 24 and 26 are rectangular in plan view. All of the walls 28, 30, 32, 34, 36 and 38 are rectangular in plan view, but each of the walls of chamber 14 are slightly greater in dimension than the corresponding wall of chamber 12.

While what is above described establishes the preferred embodiment as three-dimensional geometric figures generally rectangular in cross-sectional dimension, vaults could be equally well constructed as spheres, cubes, or a similar alternate configuration.

A duct 40 is disclosed in FIG. 1 which extends from inner chamber 12 upwardly through top wall 26 and top wall 38 respectively terminating in a horizontal plane parallel to but spaced above to wall 38. The end of duct 40 is provided with a hatch cover 42. While the geometric cross-section through duct 40 is disclosed as being rectangular, it could equally as easily be square or circular so long as the interior cross-sectional dimension of duct 40 is sufficient to allow a human being ingress and egress therethrough to and from the interior of chamber 12.

Referring back to FIG. 1 of the drawings, inner chamber 12 contains electrical equipment 44. Equipment 44 may be switchgear or the like which is automatically operable and tends to generate a substantial amount of heat when operating. Also contained within the chamber 12 is a dehumidifier 46, an electrical service and distribution box 48, an environmental control 50, an atmospheric monitor 52 and a manual transfer switch 54, all of which are appropriately coupled to electrical sources and which have uses which will be hereinafter explained.

From FIG. 5 of the drawing, it can be seen that the bottom wall 24 of chamber 12 is plywood sheeting 56 appropriately fastened to a plurality of spaced 2"×4" parallel joists 58 supporting wall 24 in spaced parallel relationship above the inner surface of bottom wall 36 of chamber 14. The surface of plywood sheeting 56 remote from joists 58 may, if desired, be covered by ceramic tiles 60 as shown in FIGS. 1 and 5 of the drawings using a tile mastic for adherence.

Note that from FIG. 3, top wall 38 is provided with margins 62, 64, 66 and 68 defining an aperture therethrough. By referring to FIG. 5, it will be seen that inner chamber 12 has an aperture through top wall 26 which registers with the aperture in top wall 38 previously described. Duct 40, which is generally rectangular in cross-sectional dimension has a flange 70 at one end adapting duct 40 to be appropriately attached to the interior surface of top wall 26 and side wall 16 and end wall 20 adjacent the aperture in top wall 26. Duct 40 then extends upwardly through the aperture defined in top wall 38 of chamber 14 terminating in engagement with hatch cover 42.

A sleeve 72 generally L-shaped in vertical cross section circumscribes duct 40 at the point where duct 40 passes through top wall 38 of chamber 14 and seals chamber 14 from leakage by compressing silicon rubber sealant of a type commercially available between the sleeve 72 and the exterior surfaces of duct 40 and top wall 38.

In FIG. 4 of the drawings, a plurality of sacrificial magnesium anodes 74 are disclosed secured in any acceptable manner to end wall 32 of chamber 14. End wall 34 may similarly be provided with such anodes 74.

Anodes 74 collect and shunt to ground any electrolytic accumulation of chamber 14. It is essential that anodes 74 must be physically, electrically coupled to chamber 14 before the surfaces of chamber 14 are cleaned by sand blasting and covered with a protective dielectric coating 75 such as disclosed in FIG. 4 of the drawings in exaggeration for exemplary purposes to prevent electrolysis. The protective dielectric coating will not properly adhere to the chamber surfaces if the anodes 74 are not first emplaced.

Cables 76 and 78 enter vault 10 through chamber 14 end wall 34 via dielectric bushings 80 prevent any induction of current from cables 76 and 78 to chamber 14.

Further reference to FIGS. 1 and 5 of the drawings will show a ladder 82 below duct 40 in inner chamber 12 for use for human ingress and egress.

Thermodynamic cooling means 84 are disclosed in chamber 12 which include an exhaust fan (not shown). Cooling means 84 includes a vent opening through end wall 22 of chamber 12.

Additionally, one or more vent openings and cold air return openings are provided respectively near top wall 26 and bottom wall 24 of chamber 14 through wall 16 behind equipment 44.

A heat vent pipe 86 is disclosed in FIGS. 4 and 5 of the drawings to vent excessive heat from vault 10 to atmosphere. Additionally, duct 40 is provided with a damper controlled vent 88 which is normally closed but which may be opened to place the chamber 12 in communication with the atmosphere when monitor 52 and control 50 sense the need resulting from conditions within chamber 12. Manual switch 54 also enables an occupant of chamber 12 to override automatic monitoring and controlling mechanism and open damper controlled vent 88 during occupancy.

Cooling means 84 which includes the exhaust fan (not shown) is rheostatically controlled to operate said fan at any desired speed determined by monitor 52 and control 50 to exhaust hot air from chamber 12 to the space between the exterior of chamber 12 and the interior of chamber 14 and thence under pressure to atmosphere through vent pipe 86.

All of the exterior surfaces of chamber 14 may be provided with metal ribs or I-beams 90 which provide additional surface for heat dissipation as well as stabilizing the positioning of vault 10 in the ground. Beams 90 are spaced and parallel as disclosed.

The vents and returns located in wall 16 behind electricalgear 44 will normally provide passive convections cooling sufficient for proper control of the environment within chamber 12 and the additional equipment above referred to is provided for dealing with the unusual environmental circumstances which may arise.

I claim:
1. An improved underground utility equipment vault comprising:
   (a) an inner chamber constructed from a non-electrically conductive material of a selected geometric configuration;
   (b) an outer chamber constructed from electrically conductive heat exchange material in a selected geometric figuration larger in overall dimension than said inner chamber;
   (c) supporting means for supporting said inner chamber within said outer chamber in spaced relationship to said outer chamber;
   (d) heat vent and cold air return means provided in said inner chamber for passive convection cooling communication between the interior of said inner chamber and the space the exterior of the inner chamber and the interior of the outer chamber;

(e) the exterior of said outer chamber coated with a protective dielectric coating and being further provided with cathodic protection in the form of a plurality of sacrificial anodes;

(f) said inner chamber containing electrical equipment electrically coupled to cables extending through the inner and outer chambers in electrically isolated relationship relative to said outer chamber.

2. The structure as set forth in claim 1, wherein said inner chamber and said outer chamber be of like geometric configurations and said outer chamber being larger in overall dimension than said inner chamber.

3. An improved underground utility equipment vault comprising: p1 (a) an inner chamber constructed from wood and having a pair of side walls, a pair of end walls, a top and a bottom wall joined to a form a hollow chamber generally rectangular in vertical cross-section therethrough, said bottom wall provided with supporting means;

(b) an outer chamber constructed from steel and having a second pair of side walls, end walls, a top and bottom wall all of greater dimensions than the side walls, end walls, top and bottom walls of said inner chamber, said supporting means of said bottom wall of said inner chamber for supporting said inner chamber in concentric spaced relationship within said outer chamber;

(c) heat vent and cold air return means provided in said inner chamber for passive convection cooling communication between the interior of said inner chamber and the space between the exterior of the inner chamber and the interior of the outer chamber;

(d) the exterior of said outer chamber coated with a protective dielectric coating and being further provided with cathodic protection in the form of a plurality of sacrificial anodes;

(e) said inner chamber containing electrical equipment electrically coupled to cables extending through the inner and outer chambers in electrically isolated relationship relative to said outer chamber.

4. The structure as set forth in claim 3, wherein said top wall of said outer chamber and said top wall of said inner chamber are provided with registering apertures and further wherein a duct is coupled at one end to the margins of said inner chamber top wall aperture and extends upwardly therefrom through the aperture in the top wall of the outer chamber to a point slightly above the ground surface, said duct being sufficient in cross-sectional dimension to permit the passage therethrough of a human body.

5. The structure as set forth in claim 4, wherein the portion of the duct protruding above ground surface is provided with an atmospheric air intake and wherein the end of said duct remote from said inner chamber is provided with a hatch cover.

6. The structure as set forth in claim 5, wherein the aperture in the outer chamber top wall through which said duct passes is provided with a drop tight seal against liquid seepage therethrough.

7. The structure as set forth in claim 5, wherein the excavation for said vault is provided with a rectangular concrete slab bottom approximately the same area as the area of the bottom wall of said outer chamber and wherein the outer surface of the bottom wall of said outer chamber is provided with a plurality of spaced ribs to support said vault is spaced relation above said slab wherein the outer surface of the top wall of said outer chamber is provided with a plurality of spaced I beams said ribs and I beams increasing the heat dissipating ability of the top and bottom walls of said outer chamber.

* * * * *